(12) United States Patent
Morizane

(10) Patent No.: US 11,230,981 B2
(45) Date of Patent: Jan. 25, 2022

(54) SUPERCHARGER-EQUIPPED ENGINE

(71) Applicant: Mazda Motor Corporation, Hiroshima (JP)

(72) Inventor: Kenichi Morizane, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/771,543

(22) PCT Filed: Dec. 7, 2018

(86) PCT No.: PCT/JP2018/045033
§ 371 (c)(1),
(2) Date: Jun. 10, 2020

(87) PCT Pub. No.: WO2019/117026
PCT Pub. Date: Jun. 20, 2019

(65) Prior Publication Data
US 2021/0172393 A1    Jun. 10, 2021

(30) Foreign Application Priority Data

Dec. 12, 2017 (JP) .............................. JP2017-237649

(51) Int. Cl.
*F02D 41/00* (2006.01)
*F02M 26/05* (2016.01)
(Continued)

(52) U.S. Cl.
CPC ......... *F02D 41/0007* (2013.01); *F02M 26/05* (2016.02); *F02M 26/06* (2016.02);
(Continued)

(58) Field of Classification Search
CPC .... F04D 41/0007; F04D 41/007; F04D 41/10; F02M 26/05; F02M 26/08; F02M 26/06; F02B 39/10
(Continued)

(56) References Cited

U.S. PATENT DOCUMENTS 6,276,334 B1 * 8/2001 Flynn ...................... F02D 41/38
123/435
8,919,107 B2 * 12/2014 Nishimura ............ F02D 41/029
60/295
(Continued)

FOREIGN PATENT DOCUMENTS

GB     2480240 A  * 11/2011  .............. F02B 37/04
JP     2008151051 A    7/2008
(Continued)

*Primary Examiner* — J. Todd Newton
(74) *Attorney, Agent, or Firm* — Alleman Hall Creasman & Tuttle LLP

(57) ABSTRACT

A supercharged engine includes an engine body, an electric supercharger, a turbocharger, an EGR passage establishing communication between an exhaust passage downstream from a turbine of the turbocharger and an intake passage upstream from a compressor of the turbocharger, a fuel supply unit configured to supply fuel into a cylinder, and a controller configured to open the EGR passage and output a control signal to the electric supercharger to increase a boost pressure of the electric supercharger during acceleration of the vehicle in which an amount of the fuel supplied by the fuel supply unit is increased in response to an acceleration request signal.

10 Claims, 10 Drawing Sheets

(51) Int. Cl.
  *F02B 39/10*   (2006.01)
  *F02D 41/10*   (2006.01)
  *F02M 26/06*   (2016.01)

(52) U.S. Cl.
  CPC .......... *F02B 39/10* (2013.01); *F02D 41/0077* (2013.01); *F02D 41/10* (2013.01)

(58) Field of Classification Search
  USPC ....................................................... 60/605.2
  See application file for complete search history.

(56) References Cited

U.S. PATENT DOCUMENTS

| | | |
|---|---|---|
| 2007/0051349 A1 | 3/2007 | Marumoto et al. |
| 2009/0044444 A1* | 2/2009 | Sugano ................. C10G 47/02 44/300 |
| 2010/0242899 A1* | 9/2010 | Hitomi ................. F02D 35/023 123/299 |
| 2012/0042849 A1* | 2/2012 | Sangkyu ............... F02M 26/25 123/294 |
| 2012/0046854 A1* | 2/2012 | Sangkyu ............. F02D 41/0057 701/108 |
| 2018/0051639 A1* | 2/2018 | Wang ....................... F02B 37/12 |
| 2020/0158030 A1* | 5/2020 | Hitomi ................ F02D 19/0649 |
| 2021/0054803 A1* | 2/2021 | Shirahashi ............ F02D 41/405 |

FOREIGN PATENT DOCUMENTS

| | | |
|---|---|---|
| JP | 2008280923 A | 11/2008 |
| JP | 2009174493 A | 8/2009 |
| JP | 2009191685 A | 8/2009 |
| JP | 2010180710 A | 8/2010 |

* cited by examiner

SUPERCHARGER-EQUIPPED ENGINE

TECHNICAL FIELD

The technique disclosed herein relates to a supercharger-equipped engine.

BACKGROUND ART

A supercharger-equipped engine including a turbocharger having a turbine disposed in an exhaust passage and a compressor disposed in an intake passage has been known.

For example, Patent Document 1 discloses a supercharger-equipped diesel engine having, in addition to a turbocharger, an electric supercharger provided in an intake passage.

CITATION LIST

Patent Document

Patent Document 1: Japanese Unexamined Patent Publication No. 2010-180710

SUMMARY OF THE INVENTION

Technical Problem

In a diesel engine, a portion of exhaust gas is recirculated to an intake passage in order to decrease combustion speed and combustion temperature, and thus, reduce the generation of raw $NO_x$. The diesel engine described in Patent Document 1 includes a high-pressure exhaust gas recirculation (EGR) system and a low-pressure EGR system. The high-pressure EGR system has a high-pressure EGR passage that establishes communication between an exhaust passage upstream of a turbine of a turbocharger and an intake passage downstream of a compressor of the turbocharger. The low-pressure EGR system includes a low-pressure EGR passage that establishes communication between an exhaust passage downstream of the turbine of the turbocharger and an intake passage upstream of the compressor of the turbocharger, and an EGR cooler that cools exhaust gas flowing through the low-pressure EGR passage. When the engine is operating in a steady state in a partial load region, the low-pressure EGR system and the high-pressure EGR system, each, recirculate the EGR gas into the intake passage, and boost pressure of the turbocharger introduces fresh air in an amount corresponding to the fuel amount into a cylinder. In this way, an equivalence ratio of an air-fuel mixture and a temperature in the combustion chamber may be appropriately adjusted, and generation of raw $NO_x$ and soot is reduced.

When a driver of a vehicle presses an accelerator pedal to make an acceleration request in the partial load region, an amount of fresh air to be introduced into the cylinder needs to be increased in accordance with the increased amount of fuel. The amount of EGR gas needs to be increased, as well. However, a supply path for EGR gas in the low-pressure EGR system is longer than in the high-pressure EGR system, which causes a delay in supply of the EGR gas in an initial phase of acceleration of the vehicle. For this reason, the high-pressure EGR system recirculates the EGR gas into the intake passage to compensate for the delayed response in the low-pressure EGR system during acceleration of the vehicle. However, the EGR gas in the high-pressure EGR system is at higher temperature than the EGR gas in the low-pressure EGR system. Hence, the in-cylinder temperature rises, and the combustion speed and the combustion temperature increases, which causes generation of raw $NO_x$.

Further, in a latter phase of acceleration, the low-pressure EGR system may recirculate the EGR gas into the intake passage, and thus, the generation of raw NO may be reduced as the amount of the EGR gas in the high-pressure EGR system is reduced. On the other hand, exhaust energy decreases by the amount of the EGR gas recirculated by the high-pressure system during the initial phase of acceleration. For this reason, the boost pressure of the turbocharger is less likely to rise, and it is difficult to ensure an amount of fresh air sufficient for the amount of fuel which has been increased in accordance with the acceleration request. As a result, the latter phase of acceleration generates soot.

The technique disclosed herein prevents emission performance from declining during acceleration.

Solution to the Problem

The technology disclosed herein is directed to a supercharger-equipped engine, which at least during acceleration of a vehicle, actively adjusts an equivalence ratio of the air-fuel mixture by using an electric supercharger.

Specifically, the supercharger-equipped engine disclosed herein includes: an engine body mounted in a vehicle; an intake passage and an exhaust passage both connected to the engine body; an electric supercharger provided in the intake passage and configured to perform supercharging by an electric motor; a turbocharger including a turbine disposed in the exhaust passage and a compressor disposed in the intake passage upstream from the electric supercharger, the turbocharger configured to perform supercharging by utilizing exhaust energy; an exhaust gas recirculation (EGR) passage establishing communication between the exhaust passage downstream from the turbine and the intake passage upstream from the compressor, the EGR passage recirculating a portion of exhaust gas to the intake passage; a fuel supply unit configured to supply fuel into a cylinder of the engine body; and a controller configured to open the EGR passage and output a control signal to the electric supercharger to increase a boost pressure of the electric supercharger during acceleration of the vehicle in which an amount of the fuel supplied by the fuel supply unit is increased in response to an acceleration request signal.

According to this configuration, the electric supercharger operates to increase the boost pressure during acceleration of the vehicle in which an amount of the fuel supplied is increased in response to an acceleration request signal. Here, the electric supercharger may increase the boost pressure by being driven from a stopped state, or may increase the boost pressure while being in a driving state. Increasing the boost pressure may rapidly increase an amount of fresh air introduced into the cylinder. An equivalence ratio of the air-fuel mixture in the cylinder decreases and generation of soot may be reduced.

Further, in the above configuration, when the boost pressure by the electric supercharger is increased, the EGR passage connected to the upstream side of the electric supercharger in the intake passage is opened. EGR gas is drawn into the intake passage via the EGR passage as the electric supercharger operates. It is thus possible to increase the amount of EGR gas introduced into the cylinder while increasing the amount of fresh air during acceleration of the vehicle. The EGR gas is at a relatively low temperature, since the EGR passage is connected to the exhaust passage downstream of the turbine of the turbocharger. Thus, a specific heat of the gas inside the cylinder may be increased by increasing the amount of EGR gas while preventing the in-cylinder temperature from becoming too high. A combustion speed and a combustion temperature may be kept low, and generation of raw $NO_x$ is reduced.

Therefore, emission performance is prevented from declining during acceleration.

The supercharger-equipped engine may include a second EGR passage establishing communication between the exhaust passage upstream from the turbine and the intake passage downstream from the electric supercharger, the second EGR passage recirculating a portion of the exhaust gas to the intake passage, wherein the controller may be configured to reduce a recirculation amount of the exhaust gas through the second EGR passage such that the recirculation amount of the exhaust gas through the second EGR passage is smaller than a recirculation amount of the exhaust gas through the EGR passage, at least during an initial phase of the acceleration of the vehicle.

Since the second EGR passage is connected to the exhaust passage upstream of the turbine of the turbocharger, the temperature of the EGR gas recirculated through the second EGR passage is higher than the temperature of the EGR gas recirculated through the EGR passage. At least during the initial phase of acceleration of the vehicle, the amount of the EGR gas introduced into the cylinder through the second EGR passage is relatively decreased. The method also includes setting the amount of EGR gas introduced into the cylinder through the second EGR passage to zero. Reducing the amount of EGR gas flowing through the second EGR passage makes it possible to prevent the in-cylinder temperature from becoming excessively high, which is advantageous for preventing generation of raw $NO_x$.

The controller may cause the electric supercharger to operate in a partial state during the acceleration of the vehicle. Here, "the electric supercharger operating in the partial state" may mean that the electric supercharger operates to decrease a torque of the electric motor to be lower than the maximum torque, and/or the electric supercharger operates to decrease a number of revolutions of a compressor wheel to be lower than a limit number of revolutions. When the electric supercharger operates in the partial state, power consumption of the electric motor decreases, and the efficiency of the compressor wheel increases. Further, in the supercharged engine equipped with both the turbocharger and the electric supercharger, the power consumption may be reduced by having the electric supercharger operate in a supportive manner.

The controller may cause the electric supercharger to operate in the partial state before receiving the acceleration request signal.

Generally, driving the electric supercharger from a stopped state requires a large amount of electric power. For this reason, if the electric supercharger is stopped when there is no acceleration request, and the electric supercharger is driven upon receiving the acceleration request signal, a large amount of electric power is required. Instead, if the electric supercharger operates in the partial state regardless of the presence or absence of the acceleration request, power consumption during increasing the boost pressure by the electric supercharger may be reduced.

The engine body may be a diesel engine having a geometric compression ratio of 16 or less. The diesel engine having a geometric compression ratio of 16 or less is likely to have a low compression end temperature. As described above, during acceleration of the vehicle, a fresh air amount ratio inside the cylinder is increased by raising the boost pressure of the electric supercharger. A specific heat ratio of gas inside the cylinder therefore rises, which increases the compression end temperature even if the temperature inside the cylinder before the start of the compression is low. Therefore, the supercharger-equipped engine having the above configuration is advantageous for securing ignitability of the air-fuel mixture in a diesel engine having a low compression ratio.

Advantages of the Invention

As explained above, the technology disclosed herein may prevent emission performance from declining during acceleration.

DESCRIPTION OF EMBODIMENTS

Figure 1:
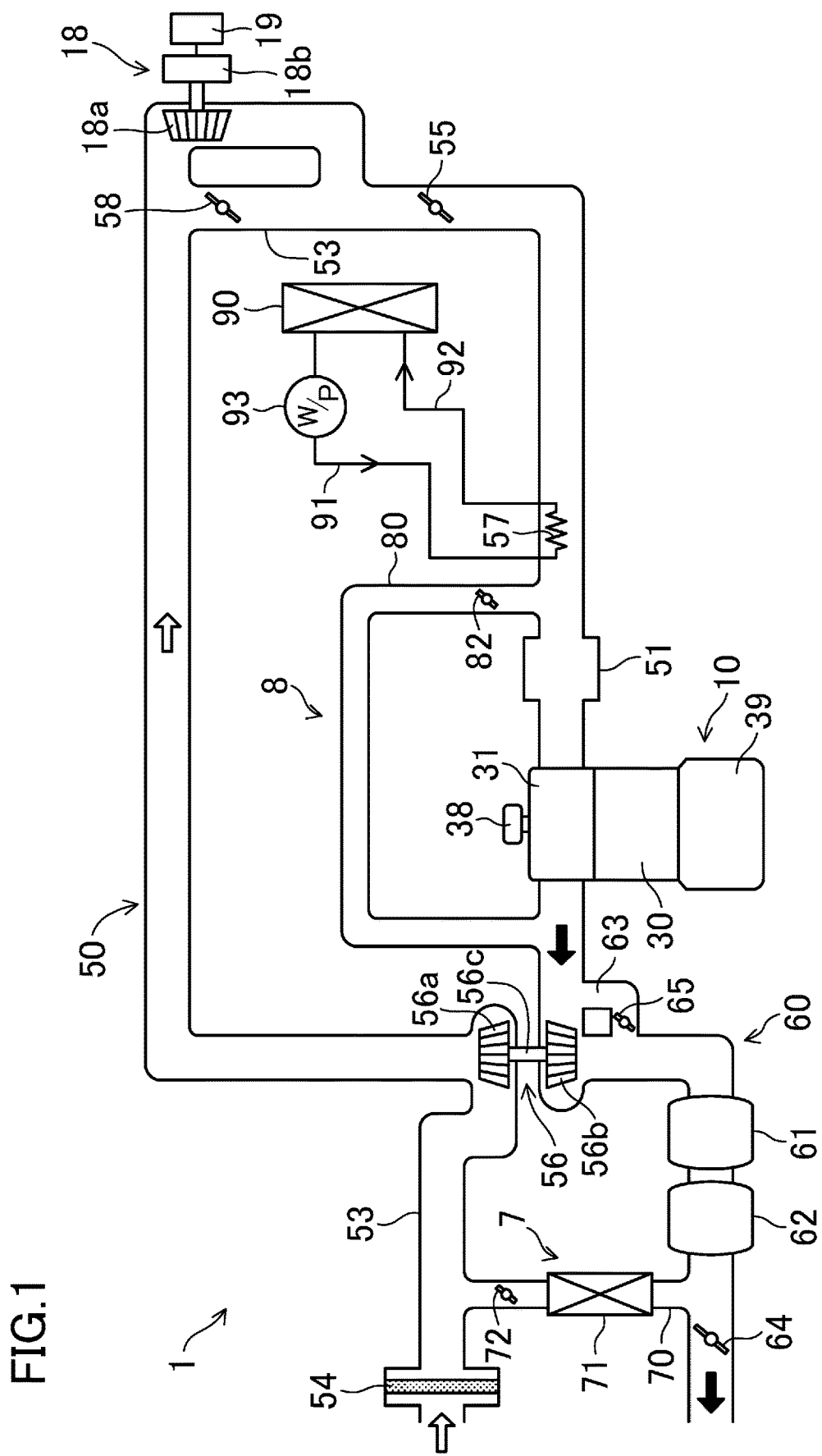
FIG. 1 is a schematic view illustrating a supercharger-equipped engine.
Figure 2:
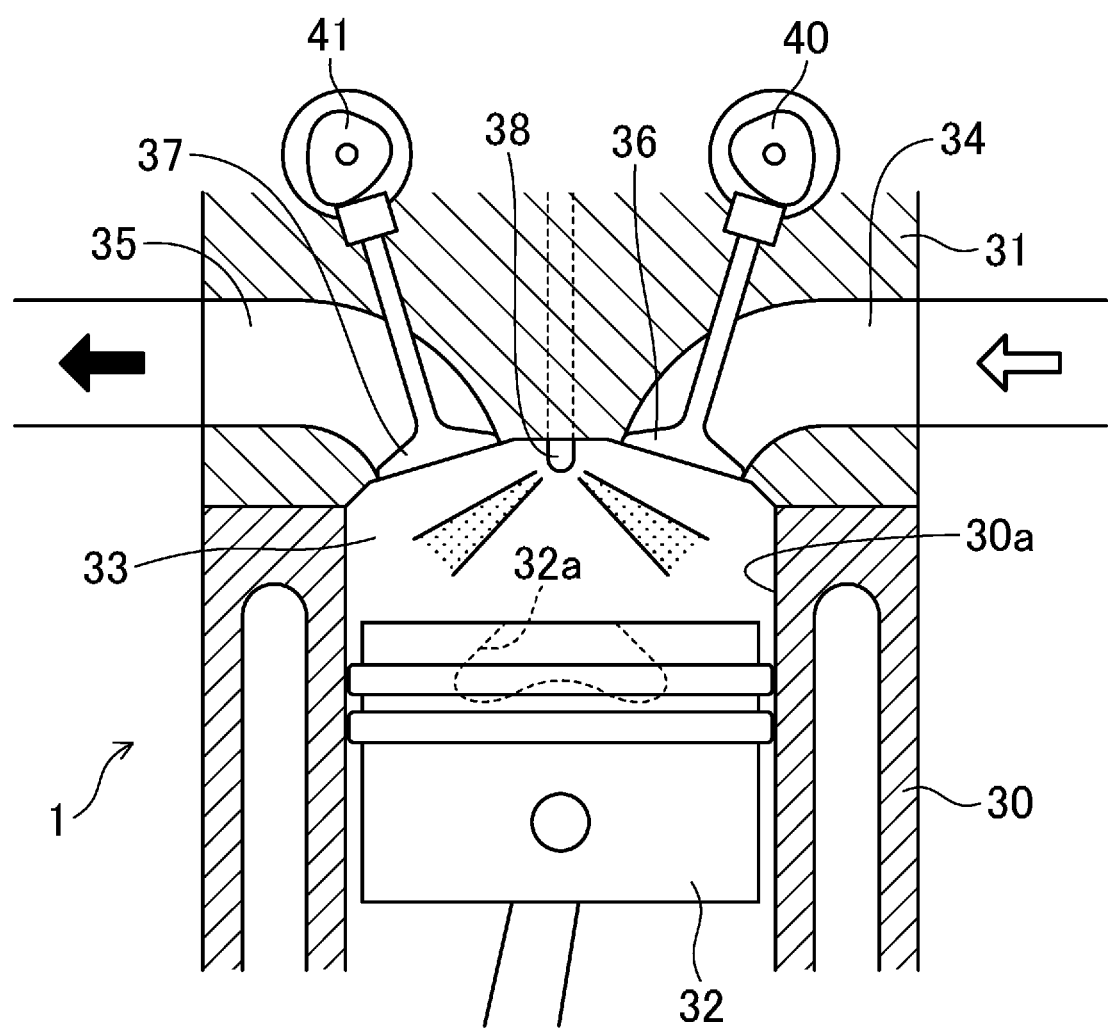
FIG. 2 is a cross-sectional view illustrating inside of a cylinder of the supercharger-equipped engine.

An embodiment of a supercharger-equipped engine will be now described in detail with reference to the drawings. FIG. 1 illustrates an engine 1 of an embodiment. The engine 1 includes an engine body 10 mounted in a vehicle and constituting a diesel engine to which fuel containing light oil as a main component is supplied. The engine body 10 has a cylinder block 30 provided with a plurality of cylinders 30a (only one shown in FIG. 2), a cylinder head 31 disposed on the cylinder block 30, and an oil pan 39 disposed under the cylinder block 30 and storing lubricating oil. Each of the cylinders 30a of the engine 1 has a piston 32 (see FIG. 2) inserted therein so as to be reciprocally slidable. The piston 32, the cylinder block 30, and the cylinder head 31 define a combustion chamber 33 (see FIG. 2). As shown in FIG. 2 on a larger scale, a cavity 32a in a shape like a re-entrant type in a diesel engine is formed on a top surface of the piston 32. When the piston 32 is located in the vicinity of the compression top dead center, the cavity 32a faces an injector 38, which will be described later. Further, the piston 32 is coupled with a crankshaft via a connecting rod in the cylinder block 30. Note that the shape of the combustion chamber 33 should not be limited to the shape shown. For example, the shape of the cavity 32a, the shape of the top surface of the piston 32, and the shape of a ceiling portion of the combustion chamber 33 may be modified as appropriate.

As illustrated in FIG. 2, each cylinder 30a has an intake port 34 and an exhaust port 35 formed in the cylinder head 31. The intake port 34 and the exhaust port 35 are respectively provided with an intake valve 36 and an exhaust valve 37 for opening and closing an opening near the combustion chamber 33.

Each intake valve 36 is opened and closed by an intake camshaft 40, and each exhaust valve 37 is opened and closed by an exhaust camshaft 41. The intake camshaft 40 and the exhaust camshaft 41 are rotatably driven in conjunction with rotation of the crankshaft. Although not shown, a valve variable mechanism of, for example, a hydraulically-actuated type is provided to adjust the opening and closing timings and the opening and closing periods of the intake valve 36 and the exhaust valve 37.

The injector (i.e., a fuel supply unit) 38, for directly injecting fuel into the cylinder 30a, is attached to the cylinder head 31 of each cylinder 30a. As shown in FIG. 2, the injector 38 is disposed such that its injection port is directed to the inside of the combustion chamber 33 from a central portion of the ceiling surface of the combustion chamber 33. The injector 38 directly injects, into the combustion chamber 33, the fuel in an amount determined in accordance with operating conditions of the engine 1 and at the timing set in accordance with the operating conditions of the engine 1.

As shown in FIG. 1, an intake passage 50 is connected to one side surface of the engine body 10 to communicate with the intake port 34 of each cylinder 30a. Meanwhile, an exhaust passage 60 for discharging burned gas (i.e., exhaust gas) from each cylinder 30a is connected to the other side surface of the engine body 10. As will be described in detail later, the intake passage 50 and the exhaust passage 60 are provided with a turbocharger 56 that supercharges intake air.

In an upstream end portion of the intake passage 50, an air cleaner 54 for filtering intake air is disposed. Meanwhile, in a vicinity of a downstream side of the intake passage 50, a surge tank 51 is disposed. The intake passage 50 on the downstream side of the surge tank 51, branches off to each cylinder 30a and serves as an independent intake passage. A downstream end of each independent intake passage is connected to the intake port 34 of each cylinder 30a.

Between the air cleaner 54 and the surge tank 51 in the intake passage 50, a compressor 56a of the turbocharger 56, an electric supercharger 18, a throttle valve 55, and a water-cooling type intercooler 57, which serves as a heat exchanger, are disposed in this order from the upstream side to the downstream side of the intake passage 50. The throttle valve 55 is basically in a fully-open state, but is brought into a fully-closed state to prevent a shock from occurring when the engine 1 is stopped. The intercooler 57 is provided in, for example, an intake manifold.

The intake passage 50 is provided with an intake-side bypass passage 53 bypassing the electric supercharger 18. The intake-side bypass passage 53 has an upstream end and a downstream end. The upstream end of the intake-side bypass passage 53 is connected to a portion of the intake passage 50 between the compressor 56a and the electric supercharger 18, and the downstream end of the intake-side bypass passage 53 is connected to a portion of the intake passage 50 between the electric supercharger 18 and the throttle valve 55. The intake-side bypass passage 53 has an intake-side bypass valve 58 for adjusting an amount of air flowing to the intake-side bypass passage 53. By adjusting the opening degree of the intake-side bypass valve 58, a ratio of the amount of intake air to be supercharged by the electric supercharger 18 to the amount of intake air passing through the intake-side bypass passage 53 can be changed in a stepwise or sequential manner.

The electric supercharger 18 includes a compressor wheel 18a provided in the intake passage 50, and an electric motor 18b that drives the compressor wheel 18a. The compressor wheel 18a is rotatably driven by the electric motor 18b, thereby supercharging intake air. That means that the electric supercharger 18 is a supercharger which does not utilize exhaust energy. Changing driving force of the electric motor 18b changes the ability of supercharging of the electric supercharger 18 (i.e., the boost pressure produced by the electric supercharger 18). As will be described in detail later, during operation of the engine 1, the electric supercharger 18 is operated in a partial state.

The electric motor 18b is driven by electric power stored in a battery 19 mounted in the vehicle. Magnitude of the driving force of the electric motor 18b changes depending on magnitude of electric power supplied to the electric motor 18b. For example, electric power generated by an alternator (not shown) mounted in a vehicle is stored in the battery 19. The battery 19 may be, for example, a 48V battery. The electric motor 18b may be driven on a 48V current.

The intercooler 57 is of a water-cooling type and is connected to a radiator 90 via a supply path 91 and a return path 92. A water pump 93 is connected to the supply path 91. The water pump 93 discharges, to the supply path 91, cooling water as a refrigerant. The cooling water passes through the supply path 91, the intercooler 57, the return path 92, and the radiator 90. Then, the cooling water returns to the water pump 93 and, again, is discharged to the supply path 91 and supplied to the intercooler 57. Then, when the cooling water passes through the intercooler 57, heat is exchanged between the cooling water and the intake air, and the intake air is cooled. The cooling water, whose temperature has risen in the intercooler 57, is cooled by exchanging heat with, for example, the atmosphere, through the radiator 90.

The upstream portion of the exhaust passage 60 is configured as an exhaust manifold which includes independent exhaust passages branched off for each cylinder 30a and connected to an outer end of the exhaust port 35 and a collecting part collecting the independent exhaust passages.

On the downstream side of the exhaust manifold, the exhaust passage 60 includes a turbine 56b of the turbocharger 56, an oxidation catalyst 61, a diesel particulate filter 62 (hereinafter referred to as a DPF 62), and an exhaust shutter valve 64 disposed in this order from the upstream side.

The turbocharger 56 receives energy of the exhaust gas (i.e., exhaust energy) and is rotatably driven thereby. Specifically, the turbine 56b of the turbocharger 56, when driven to rotate by the exhaust energy, causes the compressor 56a to rotate via a coupling shaft 56c, thereby supercharging intake air. An exhaust-side bypass passage 63 for bypassing the turbocharger 56 is provided in the exhaust passage 60. The exhaust-side bypass passage 63 has a wastegate valve 65 for adjusting a flow rate of the exhaust gas flowing to the exhaust side bypass passage 63. The turbocharger 56 is housed in a turbine case (not shown).

The turbocharger 56 may be a variable displacement turbocharger with a movable vane disposed in the turbine case. The exhaust side bypass passage 63 and the wastegate valve 65 may be omitted as long as the exhaust gas can flow while substantially bypassing the turbine 56b by adjusting the opening degree of the movable vanes.

The oxidation catalyst 61 promotes an oxidation reaction of CO and HC contained in the exhaust gas to generate $CO_2$ and $H_2O$. The DPF 62 traps fine particles, such as soot, contained in exhaust gas of the engine 1.

The exhaust shutter valve 64 is a valve capable of adjusting exhaust gas pressure in the exhaust passage 60 by adjusting the opening degree. For example, the exhaust shutter valve 64 may be used to increase the exhaust gas pressure in the exhaust passage 60 when a part of the exhaust gas flowing in the exhaust passage 60 is recirculated to the intake passage 50 through a low-pressure exhaust gas recirculation (EGR) passage 70 which will be described later.

The engine 1 does not include a catalyst for purifying $NO_x$. However, the technique disclosed herein does not exclude application thereof to an engine including a catalyst for purifying $NO_x$.

In the present embodiment, a high-pressure EGR passage 80 and the low-pressure EGR passage 70 are provided. The EGR passages 70 and 80 are connected to the intake passage 50 and the exhaust passage 60, respectively, and capable of recirculating, to the intake passage 50, a portion of the exhaust gas flowing through the exhaust passage 60.

The high-pressure EGR passage 80 is connected to a portion, in the intake passage 50, between the intercooler 57 and the surge tank 51 (that is, a portion downstream from the electric supercharger 18), and to a portion, in the exhaust passage 60, between the exhaust manifold and the turbine 56b of the turbocharger 56 (that is, a portion upstream from the turbine 56b of the turbocharger 56). The high-pressure EGR passage 80 is provided with an electromagnetic high-pressure EGR valve 82 for adjusting a flow rate of the exhaust gas (hereinafter referred to as high-pressure EGR gas) recirculated, through the high-pressure EGR passage 80, to the intake passage 50. The high-pressure EGR valve 82 is configured to adjust the flow rate of the high-pressure EGR gas by adjustment of the opening degree. The high-pressure EGR passage 80 is an example of a "second EGR passage." Hereinafter, a system including the high-pressure EGR passage 80 will be referred to as a high-pressure EGR system 8.

On the other hand, the low-pressure EGR passage 70 is connected to a portion, in the intake passage 50, between the air cleaner 54 and the compressor 56a of the turbocharger 56 (that is, a portion upstream from the compressor 56a of the turbocharger 56), and to a portion, in the exhaust passage 60, between the DPF 62 and the exhaust shutter valve 64 (that is, a portion downstream from the turbine 56b of the turbocharger 56). The low pressure EGR passage 70 is provided with an EGR cooler 71 for cooling an exhaust gas (hereinafter referred to as a low pressure EGR gas) recirculated, through the low-pressure EGR passage 70, to the intake passage 50, and an electromagnetic low-pressure EGR valve 72 for adjusting a flow rate of the low-pressure EGR gas. Similarly to the high-pressure EGR valve 82, the low-pressure EGR valve 72 is configured to adjust the flow rate of the low-pressure EGR gas by adjustment of the opening degree. The low-pressure EGR passage 70 is an example of an "EGR passage." Hereinafter, a system including the low-pressure EGR passage 70 will be referred to as a low-pressure EGR system 7.

Figure 3:
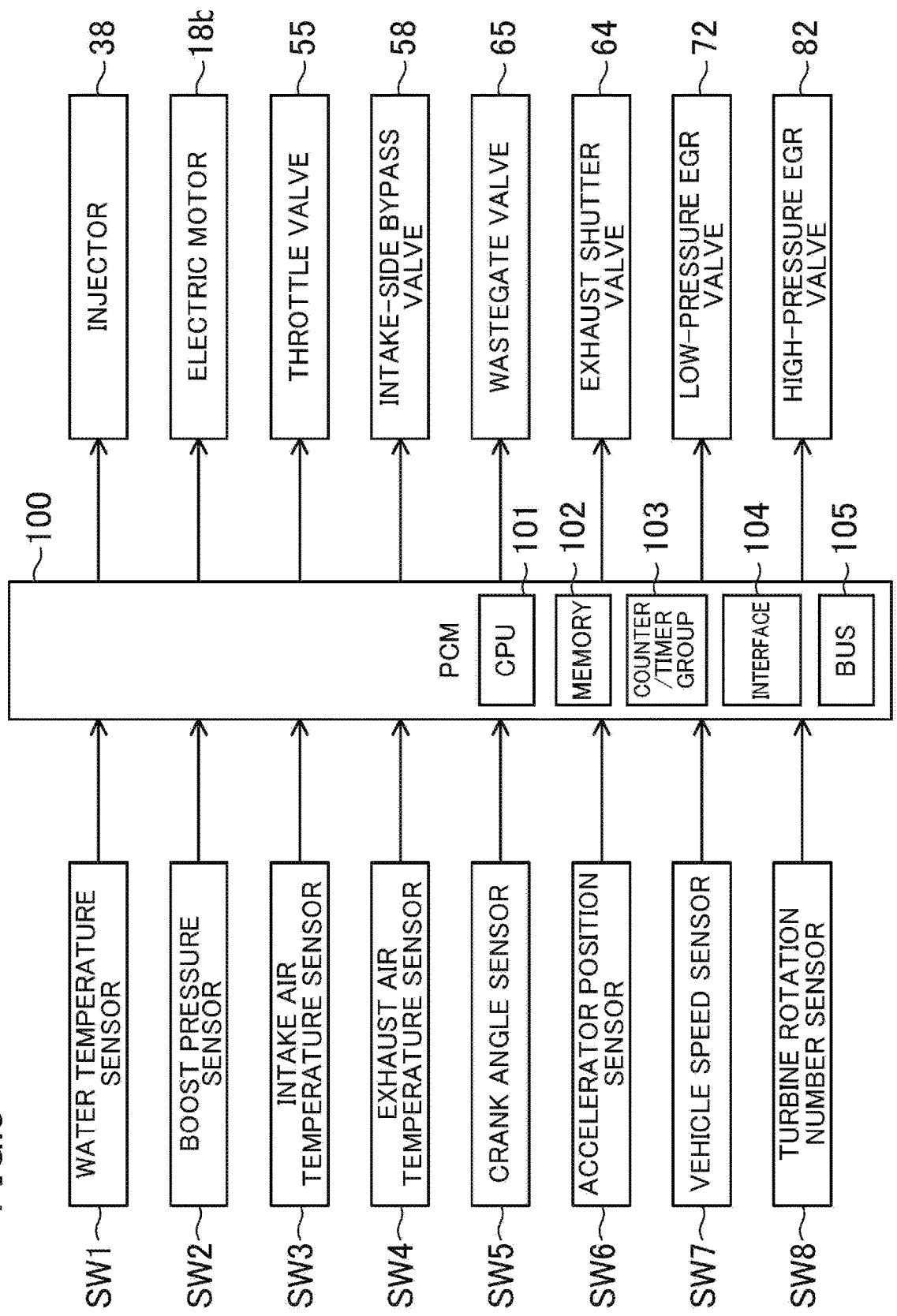
FIG. 3 is a block diagram illustrating a control system of the supercharger-equipped engine.

As shown in FIG. 3, the engine 1, configured as described above, is controlled by a powertrain control module 100 (hereinafter referred to as "PCM"). The PCM 100 is configured as a microcomputer having a central processing unit (CPU) 101, memory 102, a counter/timer group 103, an interface 104, and a bus 105 connecting these units with each other. The PCM 100 is an example of a controller. The PCM 100 receives detection signals from a water temperature sensor SW1, a boost pressure sensor SW2, an intake air temperature sensor SW3, an exhaust air temperature sensor SW4, a crank angle sensor SW5, an accelerator position sensor SW6, a vehicle speed sensor SW7, and a turbine rotation number sensor SW8. The water temperature sensor SW1 detects a temperature of an engine cooling water. The boost pressure sensor SW2 detects boost pressure. The intake air temperature sensor SW3 detects an intake air temperature. The exhaust air temperature sensor SW4 detects an exhaust air temperature. The crank angle sensor SW5 detects a rotational angle of the crankshaft. The accelerator position sensor SW6 detects an accelerator position corresponding to operation of an accelerator pedal (not shown) of the vehicle. The vehicle speed sensor SW7 detects the vehicle speed of the vehicle. The turbine rotation number sensor SW8 detects a rotational speed of the turbine 56b of the turbocharger 56.

The PCM 100 calculates an engine speed of the engine 1 based on detection results of the crank angle sensor SW5, and calculates an engine load based on detection results of the accelerator position sensor SW6. Further, the PCM 100 determines that the engine 1 is in a cold state, in which a temperature in the cylinder 30a is low, when the temperature detected by the water temperature sensor SW1 is lower than a predetermined temperature Tc, and determines the presence or absence of an acceleration request from a driver of the vehicle, based on the accelerator position detected by the accelerator position sensor SW6.

The PCM 100 outputs control signals to the injectors 38, the electric motors 18b, and the actuators of various valves 55, 58, 64, 65, 72, and 82 based on the input detection signals. The PCM 100 outputs the control signal also to the valve variable mechanism of the intake valve 36 and the exhaust valve 37.

The engine 1 is configured to have a relatively low compression ratio in which a geometric compression ratio is set to be 12 or more and 16 or less, thereby improving emission performance and combustion efficiency. In the engine 1, a decrease in the geometric compression ratio is compensated by adjusting an amount of fresh air using a turbocharger 56 and an electric supercharger 18, and adjusting the low-pressure EGR gas and the high-pressure EGR gas.

(General Description of Control of Electric Supercharger)

Figure 4:
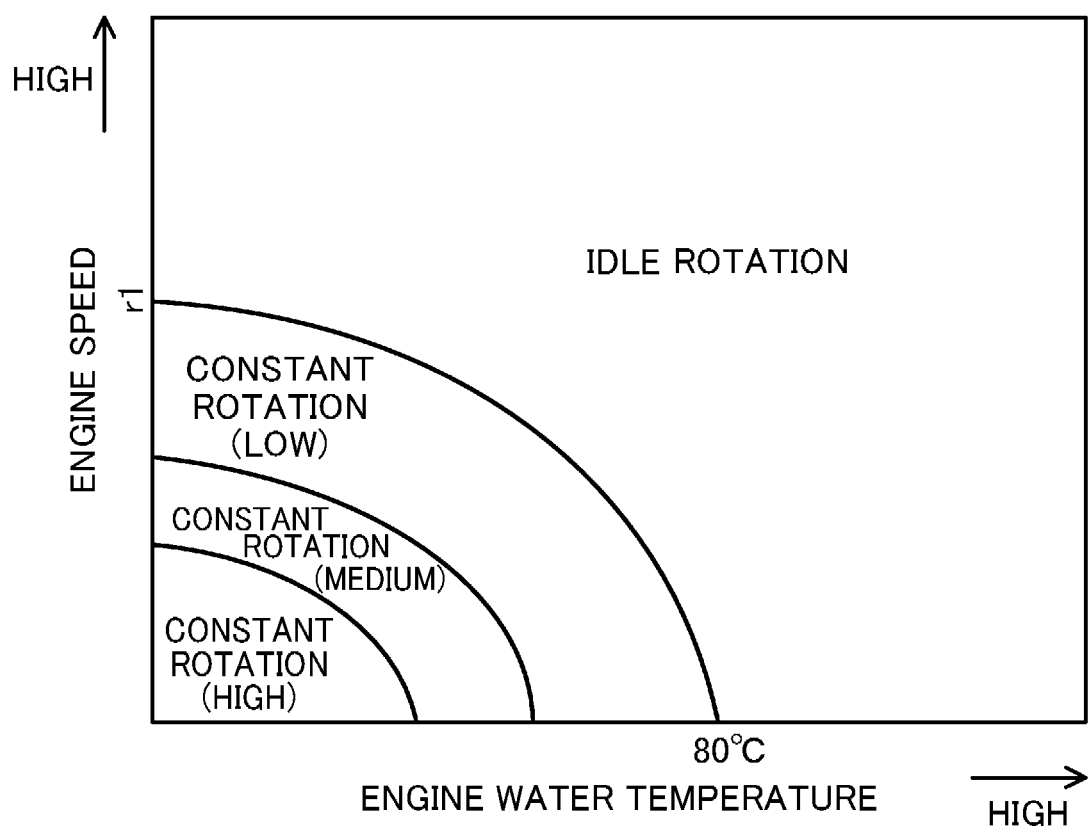
FIG. 4 is a map illustrating an operational mode of an electric supercharger.

A control of the electric supercharger 18 by the PCM 100 will be described below. FIG. 4 illustrates an aspect of the control of the electric supercharger 18. The PCM 100 is basically configured to constantly rotate the electric supercharger 18 during operation of the engine body 10. However, the PCM 100 controls the number of revolutions of the electric supercharger 18 (i.e., the boost pressure) based on the temperature of the engine cooling water detected by the water temperature sensor SW1, and a rotation speed of the engine 1 detected by the crank angle sensor SW5. Specifically, in a region in which the water temperature is low or the engine speed is low, the number of revolutions is the highest. From there, the PCM 100 performs the control to reduce the number of revolutions as the water temperature or the engine speed increases.

In the present embodiment, in a region of the engine speed in which the water temperature is 80° C. or higher or in which a pressure ratio of the compressor 56a of the turbocharger 56 is 1.2 or higher because the engine speed exceeds r1, the electric supercharger 18 is brought to the idle rotation state, and the intake-side bypass valve 58 is fully opened. In this way, supercharging by the electric supercharger 18 is substantially avoided. This allows to perform supercharging only by the turbocharger 56 without stopping the rotation of the electric supercharger 18, in the region of the engine speed in which the water temperature is 80° C. or higher or the pressure ratio is 1.2 or higher.

As described above, the electric supercharger 18 (specifically, the electric motor 18b for operating the electric supercharger 18) may be operated more effectively by constantly rotating the electric supercharger 18, compared with an on/off control in which the electric supercharger 18 is temporarily stopped in increasing the boost pressure and is driven as necessary as will be described later.

Figure 5:
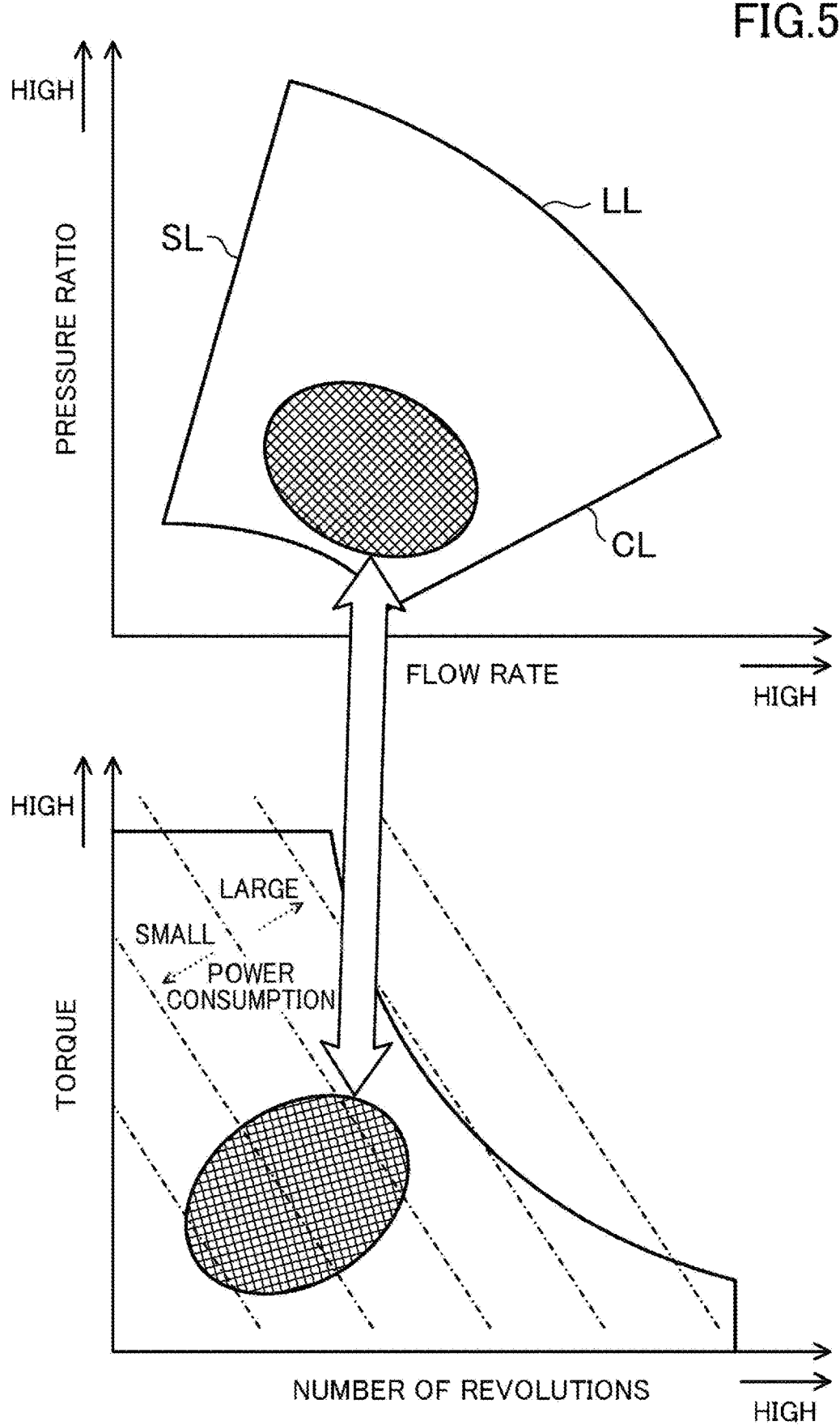
FIG. 5 shows an upper diagram and a lower diagram, where the upper diagram is a performance curve graph illustrating properties of a compressor of the electric supercharger, and the lower diagram illustrates properties of an electric motor of the electric supercharger.

FIG. 5 illustrates a performance curve representing properties of the electric supercharger 18. An upper diagram in FIG. 5 is a performance curve graph showing the properties of the compressor wheel 18a of the electric supercharger 18. The vertical axis represents the pressure ratio of the electric supercharger 18 (i.e., the ratio of the pressure on the upstream side to the pressure on the downstream side) and the horizontal axis represents a discharge flow rate. In the upper diagram of FIG. 5, the curved line LL is a rotation limit line, the straight line SL is a surge line, and the straight line CL is a choke line. The region surrounded by these lines is an operable region of the electric supercharger 18. The closer to the center side of this region, the higher the operational efficiency of the electric supercharger 18 becomes.

Since the electric supercharger 18 assists the turbocharger 56 and is used for the purpose of adjusting the amount of fresh air introduced into the cylinder 30a, the electric supercharger 18 is operated in an appropriate number of revolutions, according to the temperature of the engine cooling water and the engine speed, in a region away from the rotation limit line, such as the region marked with a mesh in FIG. 5. That is, the electric supercharger 18 is operated in a partial state which is significantly apart from the limit number of revolutions.

A lower diagram in FIG. 5 exemplifies properties of the electric motor 18b of the electric supercharger 18. The vertical axis represents torque of the electric motor 18b, and the horizontal axis represents the number of revolutions of the electric motor 18b. Dashed-dotted lines in the lower diagram in FIG. 5 represent an equal power consumption. The closer the line is to the upper right portion of the diagram, the higher the equal power consumption is. The closer the line is to the left lower portion of the diagram, the lower the equal power consumption is. The electric supercharger 18 is operated in the region marked with the mesh in the upper diagram of FIG. 5, while the electric motor 18b operates in the region marked with the mesh in the lower diagram of FIG. 5. The electric motor 18b has a relatively low power consumption and a relatively high efficiency. The state in which the electric motor 18b operates at a torque lower than a maximum torque may be referred to as being operated in a partial state of the electric supercharger 18. As described above, although the electric supercharger 18 constantly rotates during operation of the engine body 10, the electric supercharger 18 operates in the partial state, thus enabling the power consumption of the electric supercharger 18 to be reduced.

Note that the electric supercharger 18 may be stopped in the idle rotation region shown in FIG. 4.

(Combustion Control of Engine)

The basic control of the engine 1 by the PCM 100 is to determine a required driving force based mainly on the accelerator position, adjust the amount of fresh air, high-pressure EGR gas, and low-pressure EGR gas to be introduced into the cylinder 30a, and perform the operation control of the injector 38 to adjust a fuel injection amount and an injection timing, in order to implement a combustion state according to the required driving force.

Figure 6:
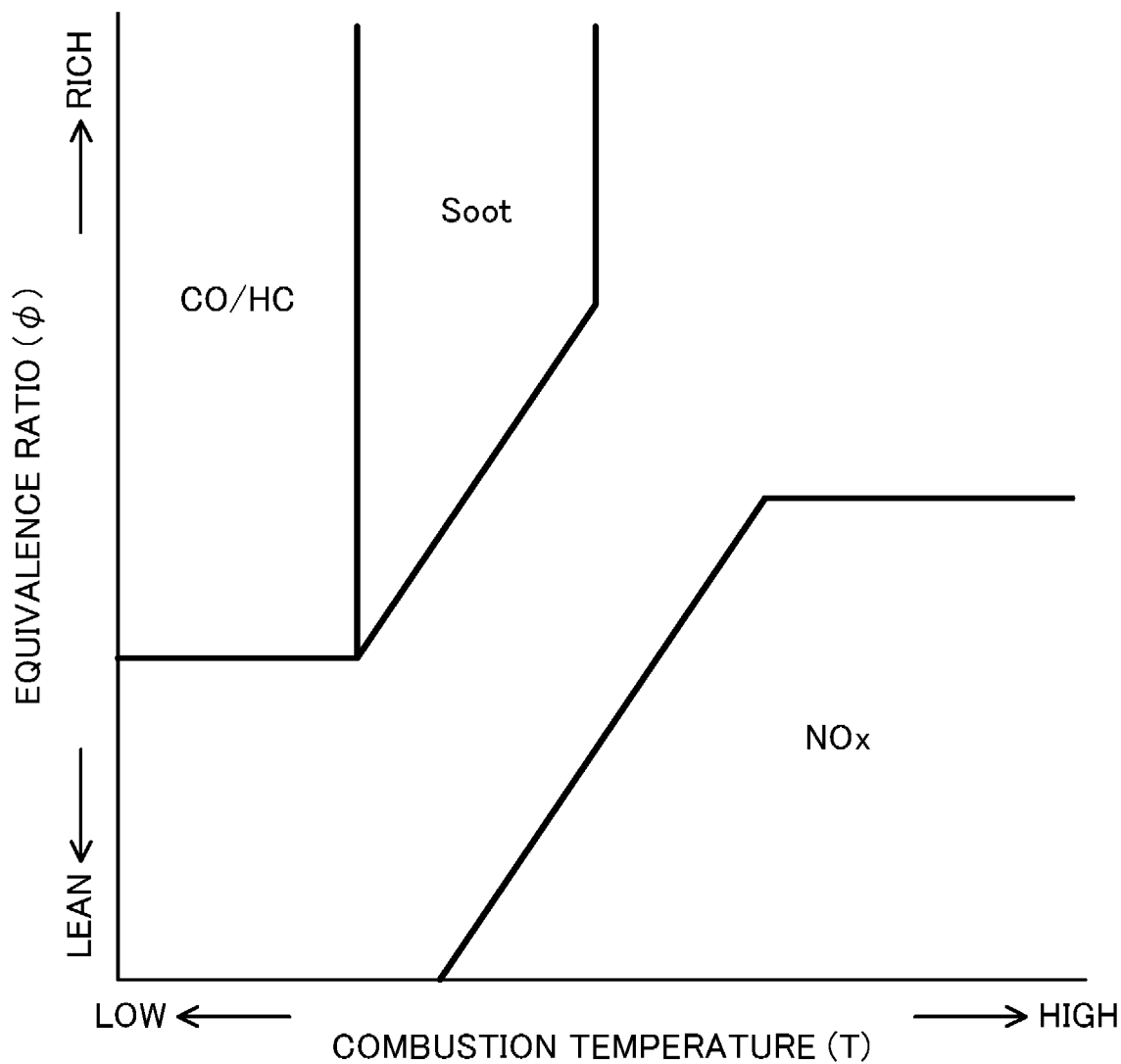
FIG. 6 is a $\varphi$-T map of a diesel engine.

FIG. 6 is an example of a φ-T map of the engine 1. The φ-T map shows regions in which an unburned component CO/HC, as well as soot and $NO_x$ are generated, in a plane consisting of a combustion temperature (T) and the equivalence ratio (φ) of an air-fuel mixture. When the combustion temperature is high, the engine 1 enters the region of $NO_x$, and when the air-fuel equivalence ratio is high, the engine 1 enters the region of soot. Further, if the combustion temperature is too low, the engine 1 enters the region of CO/HC. The engine 1 adjusts the amount of fresh air, high-pressure EGR gas, and low-pressure EGR gas, as well as the injection amount of fuel, the injection timing, and the like. In this way, the engine 1 performs combustion so as not to enter the regions on the φ-T map, in which CO/HC, soot, and $NO_x$ are generated.

Specifically, during operation in the partial load (i.e., operation of the engine under load except for the fully open load), the engine 1 adjusts the equivalence ratio of the air-fuel mixture not to become too high by introducing fresh air in an amount corresponding to the fuel supply amount into the cylinder 30a, using boost pressure generated by the turbocharger 56. The engine 1 also prevents the combustion speed and the combustion temperature from becoming too high by introducing EGR gas into the cylinder 30a, thus reducing generation of raw $NO_x$. The EGR gas to be introduced into the cylinder 30a when the engine 1 is warm is mainly low-temperature low-pressure EGR gas. High-temperature high-pressure EGR gas may be introduced into the cylinder 30a as necessary.

Figure 8:
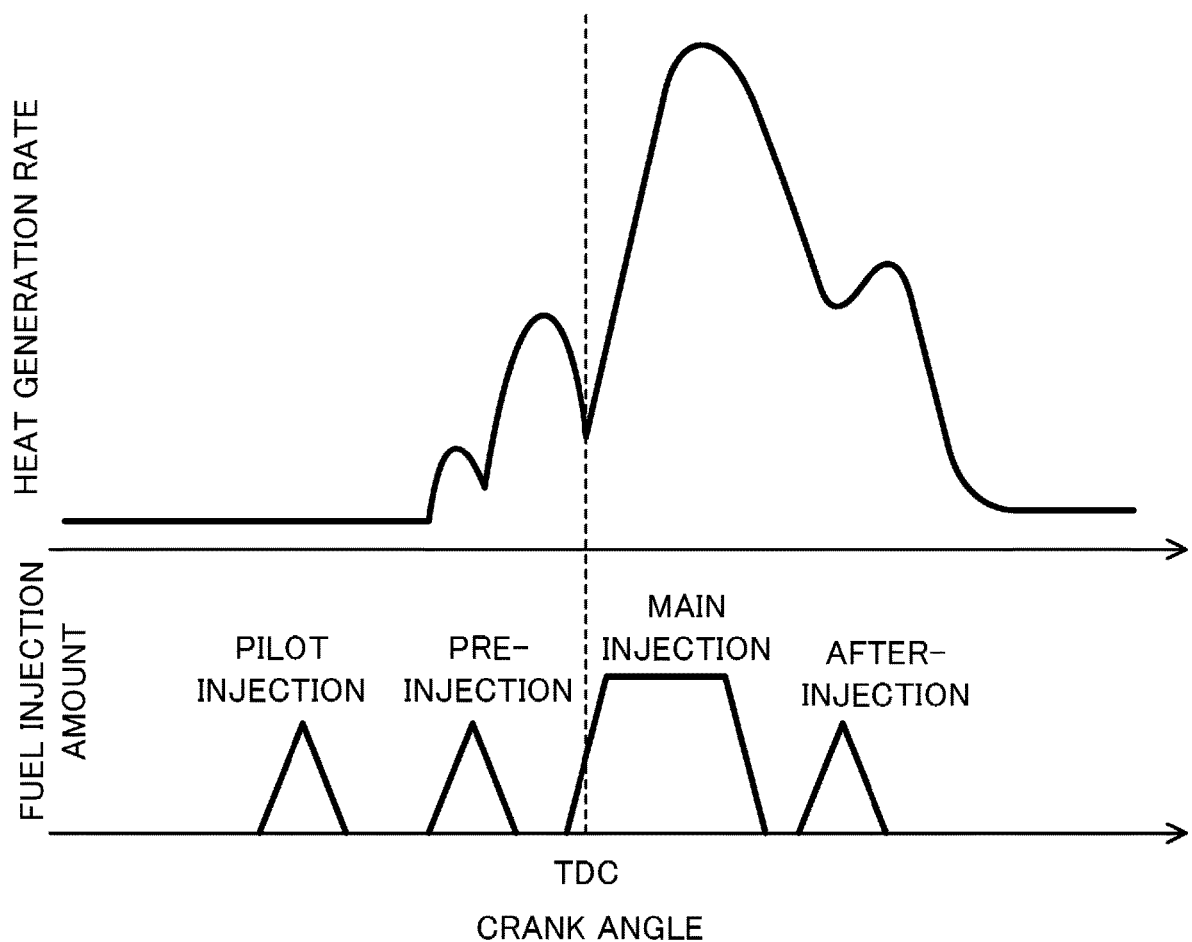
FIG. 8 is a schematic diagram illustrating an example of a fuel injection mode during a premixed combustion control and an example of history of rates of accompanying heat generation.

To reduce the generation of raw $NO_x$ during the partial load operation, the engine 1 executes a preceding injection and a main injection, as illustrated in FIG. 8. The preceding injection performs at least one fuel injection before a compression top dead center (TDC). The main injection follows the preceding injection and injects a greater amount of fuel than the preceding injection. In the injection example shown in FIG. 8, the engine 1 executes two preceding injections during a compression stroke before the compression top dead center (TDC). Then, the engine 1 executes one main injection to inject fuel in a greater amount than in the preceding injection, in a vicinity of the compression top dead center. After the main injection, the engine 1 additionally executes one after-injection, in which the engine 1 injects the same amount of fuel as in a pre-injection. Hereinafter, this injection mode will be referred to as a premixed combustion control.

From among the two preceding injections executed in the premixed combustion control, the first fuel injection having a relatively early injection timing is a pilot injection, and the second fuel injection is the pre-injection. The pilot injection and the pre-injection performed before the compression top dead center increases the mixing property of the air and the fuel, and a chemical reaction of the air-fuel mixture proceeds during the compression stroke. In this way, combustion is possible even when the temperature inside the cylinder is relatively low and, as shown in the heat generation history in FIG. 8, the preceding combustion caused by the fuel injected in the preceding injection occurs before the compression top dead center.

The preceding combustion under the premixed combustion control may increase a compression end temperature and a compression end pressure. This may optimize the temperature and the pressure inside the cylinder at the beginning of the main injection and improve the ignitability and the combustibility in the main injection. As a result, the main combustion may stably occur at the vicinity of the compression top dead center, which may increase the amount of work of the engine 1 and hence improve the fuel consumption. Further, improving the ignitability allows to reduce generation of soot and to prevent a rapid increase in heat generation in the main combustion, that is, prevent great shortening of the combustion period, which reduces generation of $NO_x$.

Further, the after-injection performed during the expansion stroke period, in which the in-cylinder pressure is decreased, may burn the soot and reduce the amount of soot discharged from the combustion chamber 33.

(Engine Control During Vehicle Acceleration)

To prevent exhaust gas emission performance from declining when the driver of the vehicle steps on an accelerator pedal to make an acceleration request while the engine 1 is in the partial load operation, the amount of fresh air introduced into the cylinder 30a, as well as the amount of EGR gas, need to be increased in correspondence with the increased amount of fuel. However, the EGR gas supply path in the low-pressure EGR system 7 is longer than in the high-pressure EGR system 8. This causes a delay in supply of the EGR gas during the initial phase of acceleration of the vehicle. For this reason, at the time of acceleration of the vehicle, the high-pressure EGR gas is recirculated to the intake passage 50 by the high-pressure EGR system 8 to compensate for the response delay of the low-pressure EGR system 7. However, since the high-pressure EGR gas has a higher temperature than the low-pressure EGR gas, the temperature in the cylinder 30a increases, and the combustion speed and the combustion temperature rise, which results in generation of raw $NO_x$.

Even if the EGR gas may be recirculated by the low-pressure EGR gas system 7, and generation of raw $NO_x$ is reduced, the exhaust energy supplied into the turbine 56b of the turbocharger 56 is low and the boost pressure of the turbocharger 56 is difficult to raise, since the EGR gas has been recirculated by the high-pressure EGR gas system 8. Thus, in the latter phase of acceleration of the vehicle, the fresh air is not introduced in a sufficient amount into the cylinder 30a. The deficiency of the fresh air leads to the generation of soot.

In order to prevent emission performance from declining during acceleration, the engine 1 actively adjusts the equivalence ratio of the air-fuel mixture by using the electric supercharger 18. Specifically, when the driver steps on the accelerator pedal to make the acceleration request, the PCM 100 determines whether driving of the electric supercharger 18 is necessary or not. If it is, the PCM 100 drives the electric supercharger 18 and increases the boost pressure. In this way, the amount of fresh air introduced into the cylinder 30a may be increased even if the boost pressure of the turbocharger 56 does not rise. Thus, the generation of soot during acceleration may be reduced.

Further, the low-pressure EGR passage 70 is connected to the intake passage 50 upstream from the electric supercharger 18. Thus, when the electric supercharger 18 is driven, the low-pressure EGR gas is drawn into the intake passage 50 through the low-pressure EGR passage 70. For this reason, the amount of the EGR gas introduced into the cylinder 30a may be increased together with the amount of the fresh air. Since the amount of the high-temperature high-pressure EGR gas is not increased, specific heat of the gas inside the cylinder 30a may be increased without increasing the temperature inside the cylinder 30a. The combustion speed and the combustion temperature may be kept low, and the generation of raw $NO_x$ during acceleration of the vehicle may be reduced. Further, the exhaust shutter valve 64 is not closed when the low-pressure EGR gas is drawn out, which is advantageous for the improvement in fuel consumption.

In this way, the engine 1 can adjust the fresh air amount and the EGR gas amount to be introduced into the cylinder 30a through increasing the boost pressure by the electric supercharger 18 during the acceleration of the vehicle. As a result, it is possible to prevent the emission performance during acceleration of the vehicle from declining.

Figure 7:
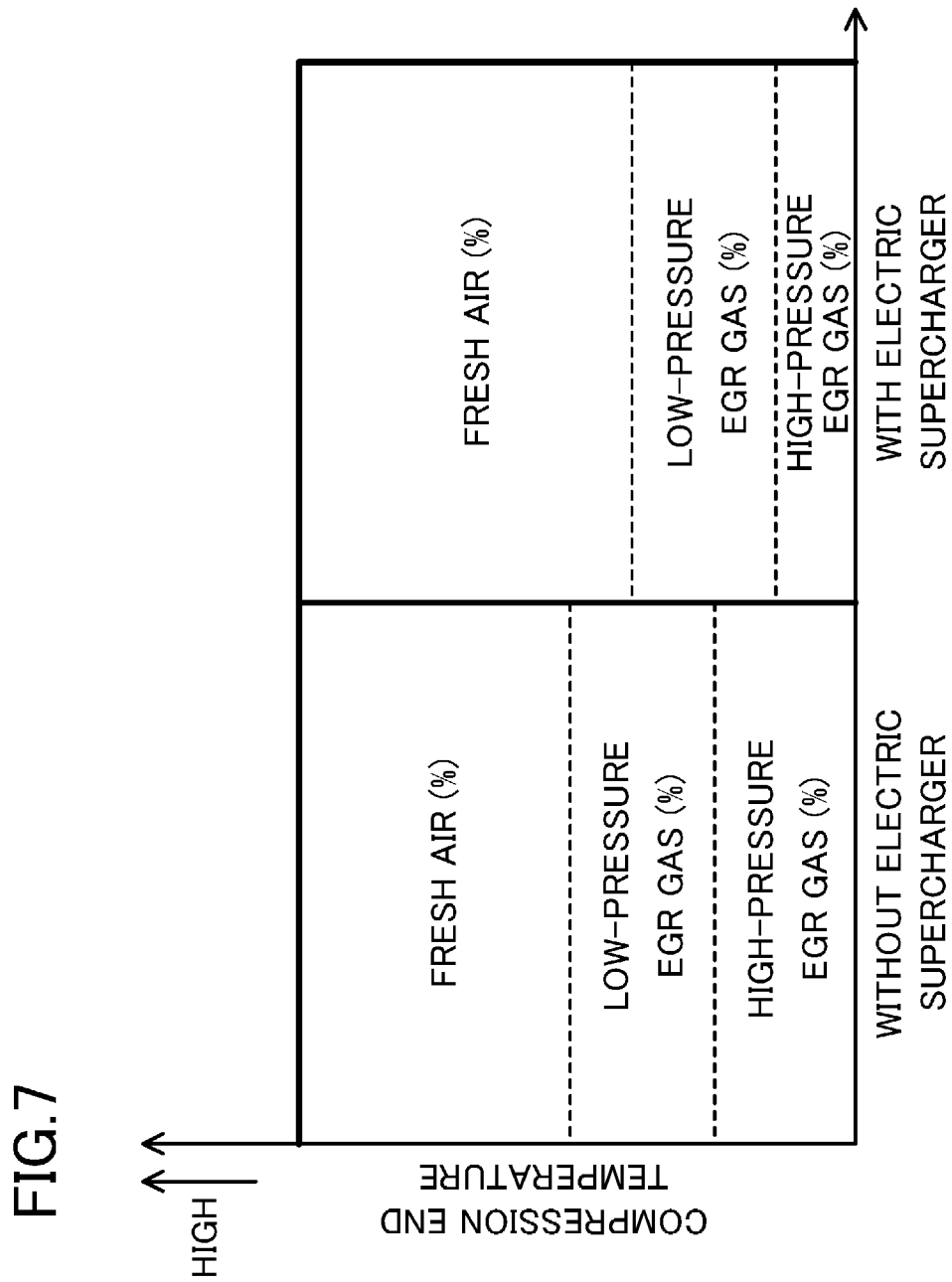
FIG. 7 is a diagram exemplifying a difference in a gas composition in the cylinder during an initial phase of acceleration of a vehicle with the electric supercharger and a vehicle without the electric supercharger.

For example, FIG. 7 is a diagram comparing a gas composition in the cylinder 30a during the initial phase of acceleration of vehicles, between a supercharged engine equipped only with the turbocharger 56 and not including the electric supercharger 18 as Comparative Example and a supercharged engine equipped with both the electric supercharger 18 and the turbocharger 56 as Example. A vertical axis in FIG. 7 represents the compression end temperature. In each of the Comparative Example and Example in FIG. 7, the gas composition inside the cylinder 30a has been set to the same compression end temperature. Note that the square areas of "fresh air," "low-pressure EGR gas", and "high-pressure EGR gas" shown in FIG. 7 represent a proportion (%) of each gas component with respect to all gas filling the cylinder 30a. Consequently, in FIG. 7, the magnitude relationship between the area of each gas component on the left side showing the Comparative Example and the area of each gas component on the right side showing the Example do not necessarily indicate the magnitude relationship between the filling amounts of the respective gas components.

First, in the supercharged engine of the Comparative Example without the electric supercharger 18, high-pressure EGR gas is introduced into the cylinder 30a instead of low-pressure EGR gas during the initial phase of acceleration, because of the response delay of the low-pressure EGR gas system 7, as described above. The ratio of the high-pressure EGR gas increases, and the temperature in the cylinder 30a is likely to become high. As a result, raw $NO_x$ may be generated.

On the other hand, in the supercharged engine of the Example equipped with the electric supercharger 18, fresh air and low-pressure EGR gas may be both introduced into the cylinder 30a in an increased amount during the initial phase of acceleration of the vehicle, as the boost pressure is increased by the electric supercharger 18. The amount of the introduced high-pressure EGR gas is smaller than the amount of the introduced low-pressure EGR gas. Since the amount of the high-pressure EGR gas introduced into the cylinder 30a does not need to be increased, the increase in the temperature inside the cylinder 30a may be avoided and generation of raw $NO_x$ may be reduced. Further, generation of soot may be prevented, since the amount of fresh air corresponding to the increased amount of fuel during acceleration is secured and the equivalence ratio of air-fuel mixture is decreased.

Further, Pmax may be quickly increased while the emission performance is prevented from declining during acceleration of the vehicle, which improves an acceleration feeling. When Pmax increases, the exhaust energy increases, as well, hence the boost pressure by the turbocharger 56 rises. In the latter phase of acceleration, the target boost pressure may be satisfied by the turbocharger 56, and thus the boost pressure by the electric supercharger 18 is decreased. The electric supercharger 18 may be stopped or the electric supercharger 18 may be brought into an idle rotation state. Thus, the power consumption of the electric supercharger 18 may be reduced. The timing at which the boost pressure of the electric supercharger 18 is decreased may be set as appropriate. For example, the timing at which the boost pressure of the electric supercharger 18 is decreased may be set based on the change history of Pmax.

Figure 9:
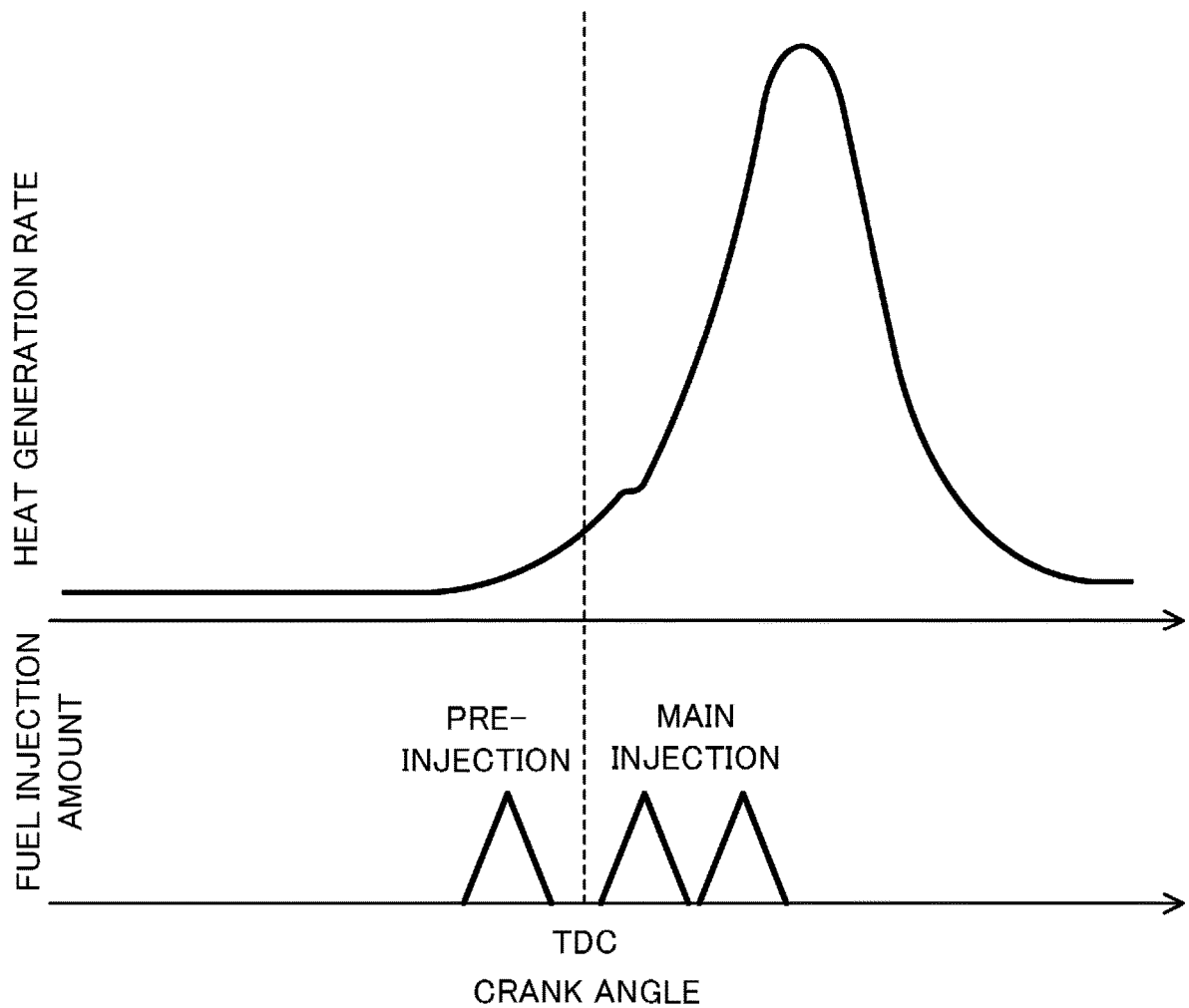
FIG. 9 is a schematic diagram illustrating an example of a fuel injection mode in a retarding control and a history of rates of accompanying heat generation.

Here, in addition to increasing the boost pressure by driving the electric supercharger 18 described above during acceleration of the vehicle, the timing of the beginning of the fuel injection may be retarded in comparison to the state of the vehicle before the acceleration, as illustrated in FIG. 9.

More specifically, the pilot injection of the preceding injection, as well as the after-injection are stopped, and the injection timing of the pre-injection and the main injection are retarded. In the example shown in FIG. 9, the main injection is divided into two injections. Hereinafter, this injection mode will be referred to as a retarding combustion control. A total fuel injection amount of the two main injections is greater than that of the preceding injection (pre-injection) in the retarding combustion control. The fuel injection mode shown herein is a mere example, and the injection timing of, and the amount of fuel injected in, the pre-injection and the main injections during the retarding combustion control are appropriately changed based on the required driving force of the vehicle.

When the pilot injection is stopped and the pre-injection is retarded, the mixing properties of the air and the fuel are reduced, and therefore, as illustrated in the upper diagram of FIG. 9, the preceding combustion does not occur before the compression top dead center. By performing supercharging by the electric supercharger 18, the intake density is increased, and as much fresh air as possible is introduced into the cylinder 30a, thereby increasing the specific heat ratio of the gas in the cylinder 30a and sufficiently raising the compression end temperature. Thus, the preceding combustion and the main combustion occur after the compression top dead center.

The retarding combustion control enables stable main combustion even when the compression ratio is low. Hence, an excessively high combustion temperature may be prevented and generation of $NO_x$ may be reduced. Further, when the amount of fresh air increases, the intake air temperature decreases. Thus, an increase in the combustion temperature and the generation of $NO_x$ may be reduced. Even in the latter phase of combustion in the retarding combustion control, the combustion temperature is higher than in the premixed combustion control illustrated in FIG. 8. Thus, soot may be burned even without the after-injection. Eliminating the after-injection is advantageous for improving the fuel economy performance.

Pmax may be increased more rapidly by performing the retarding combustion control, in addition to increasing the boost pressure by driving the electric supercharger 18, during acceleration of the vehicle. For that reason, during acceleration of the vehicle, Pmax may be increased more rapidly by performing the retarding combustion control, in addition to increasing the boost pressure by driving the electric supercharger 18, based on the change history of Pmax, specifically, when the inclination of rising of Pmax is small. Alternatively, when the inclination of rising of Pmax is small, the retarding combustion control may be not performed, while the boost pressure is increased by driving the electric supercharger 18.

Figure 10:
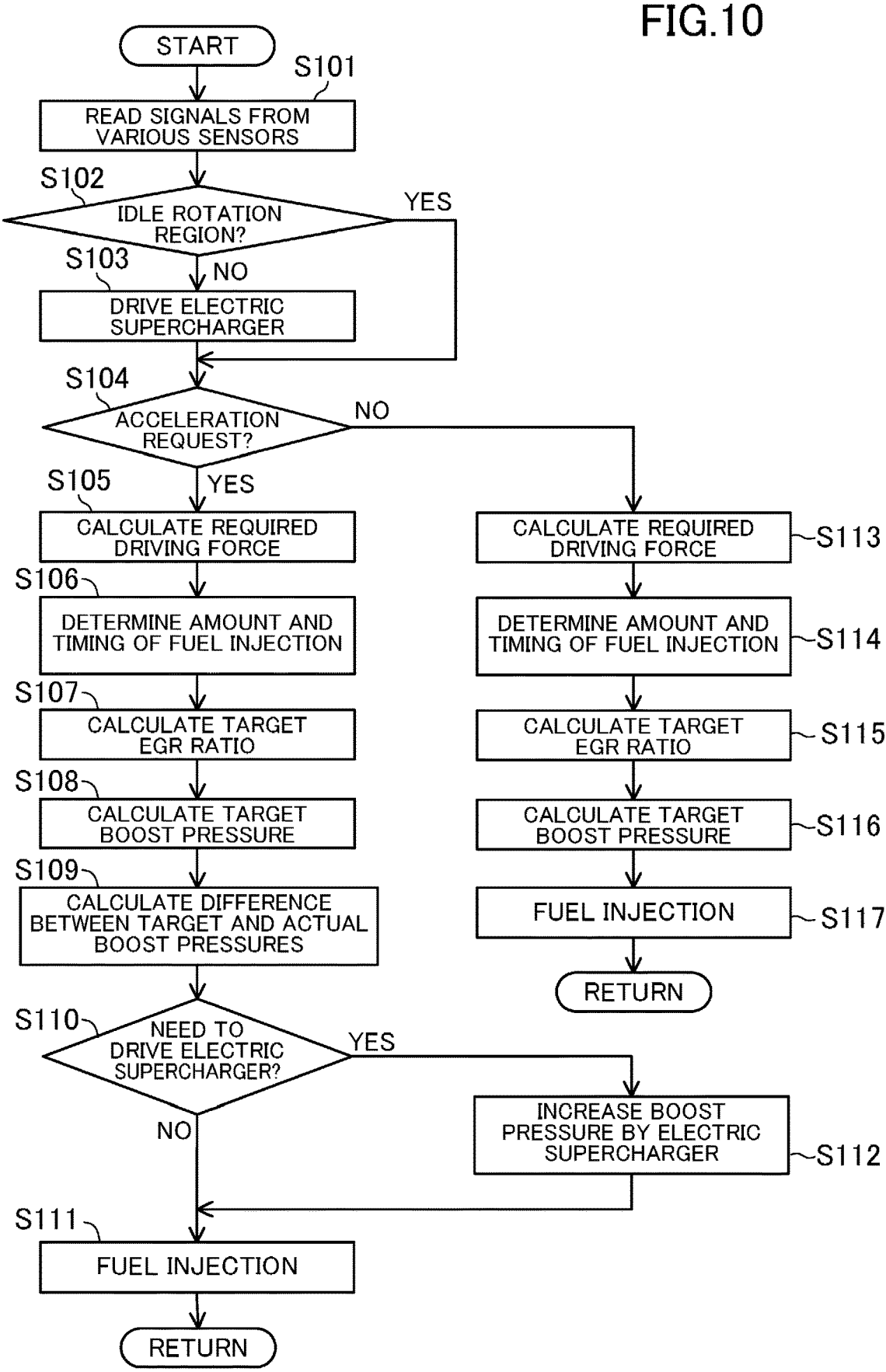
FIG. 10 is a flowchart illustrating a processing operation of an engine control performed by a powertrain control module (PCM).

Next, a processing operation of the engine control by the PCM 100 will be described with reference to the flowchart of FIG. 10. Note that the flowchart of FIG. 10 illustrates an operation of the engine body 10 when the engine 1 is warm and in a partial load region.

In the first Step S101, the PCM 100 reads signals from various sensors and determines the operational state of the engine 1. In the next Step S102, the PCM 100 determines whether the electric supercharger 18 is in the idle rotation state or not in accordance with the map illustrated in FIG. 4. When the result of the determination in Step S102 is NO, the control process proceeds to Step S103. In Step S103, the PCM 100 drives the electric supercharger 18. In accordance with the water temperature and the engine speed of the engine 1, the PCM 100 sets the number of revolutions of the electric supercharger 18 to high, medium, or low.

When the result of the determination in Step S102 is YES, the control process proceeds to Step S104. The electric supercharger 18 is in the idle rotation state.

In Step S104, the PCM 100 determines whether the driver has made an acceleration request or not. The PCM 100 determines the presence or absence of the acceleration request from the driver, based on the detected value of the accelerator position sensor SW6. When the acceleration request was made, the control process proceeds to Step S105. When there was no acceleration request, the control process proceeds to Step S113.

In Step S105, the PCM 100 calculates the required driving force of the engine 1 (the driving force based on the accelerator position and the like). In Step S106, the PCM 100 determines the fuel injection amount and the fuel injection timing in order to implement the required driving force calculated in Step S105. In Step S107, the PCM 100 calculates a target EGR ratio in order to implement the required driving force. In Step S108, the PCM 100 calculates a target boost pressure in order to implement the required driving force.

In the following Step S109, the PCM 100 calculates the difference between the target boost pressure and the actual boost pressure. Then, in Step S110, the PCM 100 determines whether the driving of the electric supercharger 18 is required or not based on the difference between the target boost pressure and the actual boost pressure calculated in Step S109. When driving of the electric supercharger 18 is necessary, the control process proceeds to Step S112, and the PCM 100 increases the boost pressure by supplying electric power to the electric supercharger 18, as described above.

On the other hand, when in Step S110 the PCM 100 determines that the driving of the electric supercharger 18 is unnecessary, the control process proceeds not to Step S112 but to Step S111.

In Step S111, the PCM 100 adjusts the opening degrees of the low-pressure EGR valve 72 and the high-pressure EGR valve 82 to achieve the target EGR rate calculated in Step S107, sets the gas composition in the cylinder 30a to the desired state, and then makes the injector 38 inject fuel according to the fuel injection amount and the fuel injection timing determined in Step S106.

The control process then returns to Step S101. Even in the case in which the boost pressure of the electric supercharger 18 is increased in the initial phase of acceleration of the vehicle, if the driving of the electric supercharger 18 is no longer necessary in the latter phase of acceleration, then the result of determination in Step S110 becomes NO, and the boost pressure by the electric supercharger 18 decreases.

On the other hand, in Step S113, to which the process has been transferred due to the absence of the acceleration request, the PCM 100 calculates the required driving force of the engine 1, similarly to Step S105. In the following Step 114, similarly to Step S106, the PCM 100 determines the fuel injection amount and the fuel injection timing in order to implement the required driving force calculated in Step S113.

In Step S115, the PCM 100 calculates the target EGR ratio in order to implement the required driving force, similarly to Step S107. In Step S116, the PCM 100 calculates the target boost pressure in order to implement the required driving force, similarly Step S108.

Then, in Step S117, the PCM 100 adjusts the opening degree of the low-pressure EGR valve 72 and the high-pressure EGR valve 82 in order to implement the target EGR ratio calculated in Step S115, sets the gas composition in the cylinder 30a to the desired state, and then makes the injector 38 inject the fuel according to the fuel injection amount and the fuel injection timing determined in Step S114.

Consequently, during acceleration of the vehicle, the PCM 100 increases the boost pressure by the electric supercharger 18, which allows to rapidly increase the amount of fresh air to be introduced into the cylinder 30a. Actively adjusting the equivalence ratio of the air-fuel mixture may increase Pmax of the engine body 10 rapidly and improve the acceleration feeling, while reducing generation of soot.

Further, associated with the driving of the electric supercharger 18, the low-pressure EGR gas is drawn from the low-pressure EGR passage 70 into the intake passage 50, and the amount of the EGR gas introduced into the cylinder 30a may be increased accordingly. Thus, the combustion speed and the combustion temperature may be prevented from becoming too high, and generation of raw $NO_x$ may be reduced.

Thus, the engine 1 may prevent the emission performance from declining during acceleration.

As illustrated in FIG. 7, when the ratio of the amount of fresh air inside the cylinder 30a is increased due to increasing the boost pressure of the electric supercharger 18, the ratio of the specific heat of the gas in the cylinder 30a increases. The compression end temperature therefore rises even if the temperature inside the cylinder 30a is low. This configuration is advantageous in securing the ignitability of the air-fuel mixture in a diesel engine having a low compression ratio in which the geometric compression ratio is set to 16 or less.

Further, the exhaust energy rises through the rapid increase in the boost pressure caused by the electric supercharger 18 at the beginning of acceleration and the rapid increase in Pmax of the engine body 10. In this way, the boost pressure by the turbocharger 56 may also be rapidly increased. If the target boost pressure is achieved by the turbocharger 56 in the latter phase of acceleration, the emission performance may be prevented from declining and the power consumption may be reduced, by decreasing the boost pressure of the electric supercharger 18.

As shown in FIG. 4 or 5, the electric supercharger 18 operates in the partial state, regardless of the presence or absence of the acceleration request. This makes it possible to avoid supplying inrush electric power into the electric motor of the electric supercharger 18 every time acceleration occurs. This configuration may reduce the power consumption by the electric supercharger 18 in increasing the boost pressure and is also advantageous in improving reliability of the electric supercharger 18.

The present invention is not limited to this embodiment. Any change can be made within the scope of the claims as appropriate.

For example, the technique disclosed herein is not limited to application to a diesel engine, and may also be applied to an engine using fuel including gasoline or naphtha.

The foregoing embodiment is merely a preferred example in nature, and the scope of the present invention should not be interpreted in a limited manner. The scope of the present invention is defined by the appended claims, and all variations and modifications belonging to a range equivalent to the range of the claims are within the scope of the present invention.

DESCRIPTION OF REFERENCE CHARACTERS

1 Engine
10 Engine Body
18 Electric Supercharger
38 Injector (Fuel Supply Unit)
50 Intake Passage
56 Turbocharger
56a Compressor
56b Turbine
60 Exhaust Passage
70 Low-pressure EGR Passage (EGR Passage)
80 High-pressure EGR Passage (Second EGR Passage)
100 PCM
SW5 Crank Angle Sensor (Sensor)

The invention claimed is:

1. A supercharger-equipped engine, comprising:
an engine body mounted in a vehicle;
an intake passage and an exhaust passage both connected to the engine body;
an electric supercharger provided in the intake passage and configured to perform supercharging by an electric motor;
a turbocharger including a turbine disposed in the exhaust passage and a compressor disposed in the intake passage upstream from the electric supercharger, the turbocharger configured to perform supercharging by utilizing exhaust energy;
a first exhaust gas recirculation (EGR) passage establishing communication between the exhaust passage downstream from the turbine and the intake passage upstream from the compressor, the first EGR passage recirculating a portion of exhaust gas to the intake passage;
a second EGR passage establishing communication between the exhaust passage upstream from the turbine and the intake passage downstream from the electric supercharger, the second EGR passage recirculating a portion of the exhaust gas to the intake passage;
an injector configured to supply fuel into a cylinder of the engine body; and
a controller configured to open the first EGR passage and output a control signal to the electric supercharger to increase a boost pressure of the electric supercharger during acceleration of the vehicle in which an amount of the fuel supplied by the injector is increased in response to an acceleration request signal, wherein an amount of the exhaust gas introduced into the cylinder via the second EGR passage is smaller than an amount of the exhaust gas introduced into the cylinder via the first EGR passage.

2. The supercharger-equipped engine of claim 1, wherein the controller causes the electric supercharger to operate in a partial state during the acceleration of the vehicle.

3. The supercharger-equipped engine of claim 2, wherein the controller causes the electric supercharger to operate in a partial state before receiving the acceleration request signal.

4. The supercharger-equipped engine of claim 1, wherein the engine body is a diesel engine having a geometric compression ratio of 16 or less.

5. The supercharger-equipped engine of claim 1, wherein the first EGR passage has a first EGR valve, and the second EGR passage has a second EGR valve, and the controller adjusts opening degrees of the first EGR valve and the second EGR valve during acceleration of the vehicle.

6. The supercharger-equipped engine of claim 1, wherein during acceleration of the vehicle, the controller retards a timing of beginning of fuel injection compared to a fuel injection timing before the acceleration.

7. The supercharger-equipped engine of claim 6, wherein the injector performs a pilot injection, a pre-injection, a main injection, and an after-injection sequentially, and during the acceleration of the vehicle, the injector stops the pilot injection and the after-injection, and performs the pre-injection and the main injection.

8. The supercharger-equipped engine of claim 7, wherein during the acceleration of the vehicle, the controller retards timings of the pre-injection and the main injection compared to a fuel injection timing before the acceleration.

9. The supercharger-equipped engine of claim 7, wherein during the acceleration of the vehicle, the injector divides the main injection into two main injections and performs the two main injections.

10. The supercharger-equipped engine of claim 9, wherein a total fuel injection amount of the two main injections is greater than a fuel injection amount of the pre-injection.

* * * * *